Oct. 19, 1954
A. P. LAGE
2,691,958
WIND ORIENTED LIVE STOCK DISPENSER
Filed April 17, 1953
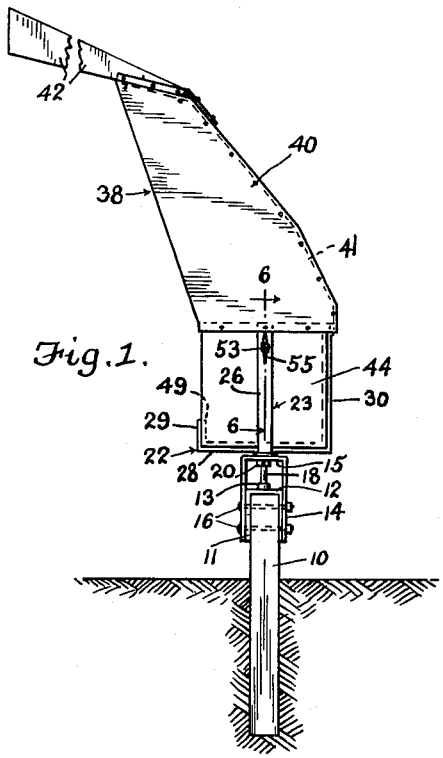
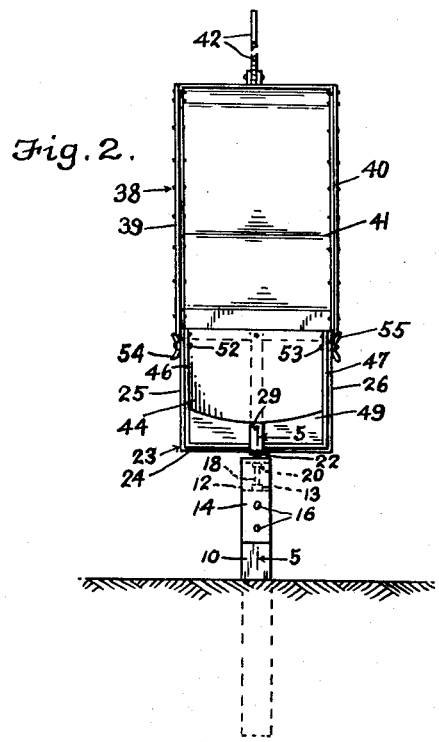
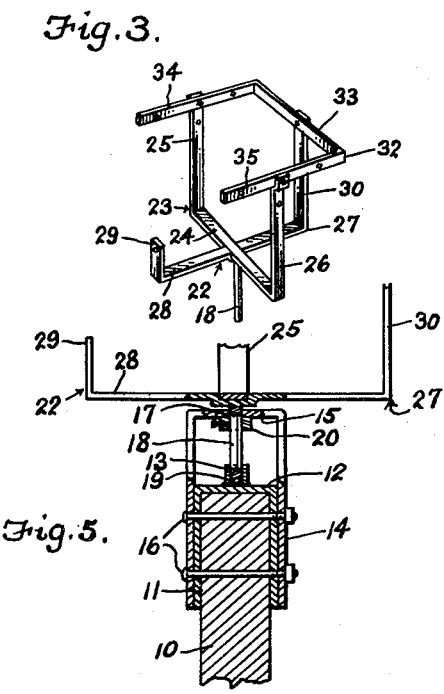
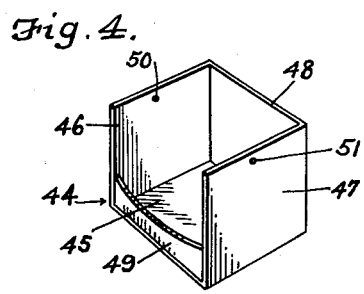
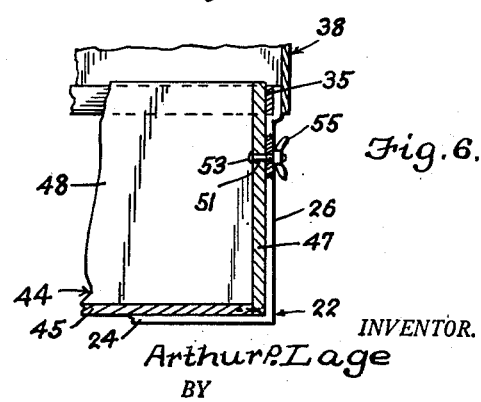
INVENTOR.
Arthur P. Lage
BY
McMorrow, Berman & Davidson
Attorneys.

Patented Oct. 19, 1954

2,691,958

UNITED STATES PATENT OFFICE 2,691,958

WIND ORIENTED LIVESTOCK DISPENSER

Arthur P. Lage, Carroll, Nebr.

Application April 17, 1953, Serial No. 349,335

2 Claims. (Cl. 119—51)

This invention relates to material dispensing box assemblies for live stock and more particularly to a box assembly of the general character disclosed in my prior patent, No. 1,796,466, patented March 17, 1931.

It is among the objects of the invention to provide a box or receptacle assembly for dispensing to live stock edible materials, such as either common salt, minerals, vitamin containing preparations, or admixtures of two or more of the aforenamed substances, wherein such assembly includes a vertically disposed post or pedestal, a material receptacle pivotally mounted on the top of the pedestal and having a hood provided with one open side giving access to the interior of the box, and a wind vane secured to the hood and maintaining the open side of the hood at the leeward side of the box and hood assembly to preclude atmospheric precipitation from entering the box through the open side of the hood; in which a box receiving frame is mounted on the post and carries the hood and an edible material containing box is removably mounted in the frame and is replaceable whenever necessary or desired; in which the box is formed of a material, such as wood, which is resistant to the action of the edible material, and the remainder of the assembly, with the elective exception of the post or pedestal, is formed of a material of high structural strength, such as iron or steel; in which the box is detachably secured in the frame by suitable fasteners, such as bolts or screws; and which is simple and durable in construction, economical to manufacture, and effective and efficient in use.

Other objects and advantages will become apparent from a consideration of the following description and the appended claims in conjunction with the accompanying drawing wherein:

Figure 1 is a side elevational view of a material dispensing assembly illustrative of the invention;

Figure 2 is a front elevational view of the dispensing assembly illustrated in Figure 1;

Figure 3 is a perspective view of a box receiving frame constituting an operative component of the assembly;

Figure 4 is a perspective view of a box also constituting an operative component of the assembly;

Figure 5 is a fragmentary cross-sectional view on an enlarged scale on the line 5—5 of Figure 2; and Figure 6 is a fragmentary cross-sectional view on an enlarged scale on the line 6—6 of Figure 1.

With continued reference to the drawing, the material dispensing assembly comprises a vertically disposed pedestal 10 which is illustrated as being a timber post of rectangular cross-sectional shape embedded at one end in the ground and having its upper end disposed a predetermined distance above the surface of the ground. A cap 11 in the form of a U-shaped body of iron or steel plate is mounted on the upper end of the post and has a bight portion 12 covering the top end surface of the post. An upwardly opening socket 13 is mounted on the upper surface of the bight portion 12 of the cap 11 centrally of the bight portion 12 and a bracket 14, also constituted by a U-shaped body of iron or steel plate is secured to the upper portion of the post in overlying relationship to the cap 11 and has a bight portion 15 disposed above and substantially parallel to the bight portion 12 of the cap. The cap 11 and bracket 14 are secured to the post by suitable means, such as the bolts 16 spaced apart longitudinally of the post and extending through the leg portions of the cap and the bracket and through the upper portion of the post. The bight portion 15 of the bracket 14 is provided with a centrally disposed aperture 17 which is in vertical alignment with the socket 13 and a shaft 18 extends through the aperture 17 and is journalled at its lower end in the socket 13, a bearing ball 19 being disposed in the socket between the bottom end of the shaft 18 and the top surface of the bight portion 12 of the cap 11 to provide an antifriction bearing for the lower end of the shaft. An abutment collar 20 receives the shaft between the bight portions 12 and 15 and is locked to the shaft in position such that it bears against the under-surface of the bight portion 15 to restrain the shaft against movement out of the socket 13.

The upper end of the shaft is disposed above the upper surface of the bight portion 15 of the bracket and a rectangular frame, generally indicated at 22, is connected to the post 10 for rotary movement about a vertical axis or the shaft 18. This frame comprises a first U or bracket shaped member 23 having a straight bight portion 24 secured at its mid-length location to the upper end of the shaft 18 with its longitudinal center line substantially perpendicular to the longitudinal center line of the shaft, and legs 25 and 26 extending upwardly from the respectively opposite ends of the bight portion 24, perpendicular to the bight portion and spaced upon a second U-shaped member 27 having a bight portion 28 perpendicularly bisected by the bight portion 24 of the member 23 and having its longitudinal center line perpendicular to the longitudinal center line of the shaft 18 and legs 29 and 30 extending perpendicularly upwardly from the bight portion 28 at the respectively opposite ends of the latter and in spaced and substantially parallel relationship to each other, and a third U-shaped member 32 having a straight bight portion 33 secured at its midlength location to the leg 30 of the member 27 at the upper end of the leg 30 and legs 34 and 35 extending perpendicularly from the bight portion 33 at the respectively opposite ends of the latter and substantially parallel to each other. The member 33 is substantially horizontally disposed and the legs 34 and 35 thereof are connected intermediate their length to the legs 25 and 26 respectively of the member 23 at the upper end of the legs 25 and 26. The leg 29 of the member 27 adjacent the open end of the member 32 is shorter than the remaining legs and this shorter leg together with the open end of the member 32 provides an opening in the side of the frame through which an edible material containing box may be placed in and removed from the frame.

A hood, generally indicated at 38, is mounted at its lower end on the U-shaped member 32 of the frame and comprises spaced apart and substantially parallel side plates 39 and 40 and a back plate 41, the front side of the hood being open. The hood is inclined upwardly and toward the open side thereof from the upper end of the frame 22 and the back plate 41 extends over the upper end of the hood to provide a shelter for an edible material containing box mounted in the frame. A wind vane 42 is secured at one end to the upper end of the hood 38 and projects from the upper end of the hood outwardly of the open side of the hood so that the open side of the hood is maintained at all times at the leeward side of the hood to prevent atmospheric precipitation from entering an edible material containing box mounted in the frame 22 through the open side of the hood.

The material containing box, as generally indicated at 44 and particularly illustrated in Figure 4, is of rectangular shape and has a flat bottom wall 45, side walls 46 and 47 projecting perpendicularly upwardly from the bottom wall 45 at respectively opposite sides of the bottom wall, and a back wall 48 projecting perpendicularly upwardly from the bottom wall at the back edge of the bottom wall and joined along its respectively opposite side edges to the corresponding edges of the side walls 46 and 47 of the back, and a front wall 49 projects perpendicularly upwardly from the front edge of the bottom wall 45 and is joined at its opposite sides or ends to the corresponding edges of the side walls 46 and 47. The walls 46, 47, and 48 are all preferably of substantially the same height but the front wall 49 has a height materially less than the side and back walls of the box to provide an access opening in the front side of the box for live stock, such as cattle, to lick the edible material contained in the box.

The box is of a size and shape to fit closely in the frame 22 and the side walls 46 and 47 of the box are provided medially of their width and near their upper ends with apertures 50 and 51 respectively which register with corresponding apertures provided in the legs 25 and 26 of the U-shaped member 23 and screws or bolts 52 and 53 extend through the apertures 50 and 51 in the box and the registering apertures in the frame and carry wing nuts 54 and 55 at the other side of the frame to releasably secure the box in the frame.

The post or pedestal 10 may be made of wood or other material, as may be desired but the cap 12, bracket 14, frame 22, hood 38, and wind vane 42 are all preferably formed of a material, such as iron or steel, of high structural strength. The box 44 will be formed of a material, such as wood.

Because of their fragile nature, the boxes are frequently damaged or broken or become deteriorated by the action of weather thereon and it is contemplated that the boxes will be provided inexpensively and will be replaced whenever necessary or desired by merely removing a damaged or otherwise unsatisfactory box from the frame 22 and placing a new box in the frame, the screws 52 and 53 being removed and replaced when the box is changed.

When the box is properly disposed in the frame 22 with the partly opened front side of the box adjacent the short leg 29 of the frame, the front side of the box as well as the open front side of the hood 40 will be maintained at the leeward side of the box and hood assembly by reason of the pivoting of the assembly about the axis of the shaft 18 by the action of the wind on the wind vane 42.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An edible material dispensing assembly for live stock comprising an upright post, a frame embodying a pair of vertically disposed U-shaped brackets arranged so that the bights crisscross each other and connected at the crisscross point to said post for rotary movement about a vertical axis, the legs of one of said brackets being of the same height and forming the sides of the frame with one of the legs of the other of said brackets being of the same height as that of the legs of said one bracket and forming the back of the frame and the other of the legs of the other of said brackets being of a height shorter than that of said one leg of said other bracket and forming the front of the frame, a horizontally disposed U-shaped member arranged so that its legs face toward the front of the frame and having its bight secured at its central point to the upper end of said one leg of said other bracket and having its legs secured intermediate its ends to the upper ends of the legs of said one bracket, an edible material containing box disposed within said frame, said box having a front wall of a height slightly higher than the shorter leg of said other bracket and bearing against said shorter leg, an upstanding hood provided with one open side having its lower end secured to said member, and a wind vane secured to the upper end of said hood and extending from the open side thereof to maintain said open side at the leeward side of said hood.

2. An edible material dispensing assembly for live stock comprising an upright post, a frame embodying a pair of vertically disposed U-shaped brackets arranged so that the bights crisscross each other and connected at the crisscross point to said post for rotary movement about a vertical axis, the legs of one of said brackets being of the same height and forming the sides of the frame with one of the legs of the other of said brackets being of the same height as that of the legs of said one bracket and forming the back of the frame, and the other of the legs of the other of said brackets being of a height shorter than that of said one leg of said other bracket and forming the front of the frame, a horizontally disposed U-shaped member arranged so that its legs face toward the front of the frame and having its bight secured at its central point to the upper end of said one leg of said other bracket and having its legs secured intermediate its ends to the upper ends of the legs of said one bracket, an edible material containing box disposed within said frame, said box having a bottom resting upon the crisscross bights of said pair of brackets and having side walls and a back wall resting against the legs of said one bracket and the legs of said member and the bight of said member in said one leg of said other bracket respectively, said box also having a front wall of a height slightly higher than the shorter leg of said other bracket and bearing against said shorter leg, an upstanding hood provided with one open side having its lower end secured to said member, and a wind vane secured to the upper end of said hood and extending from the open side thereof to maintain said open side at the leeward side of said hood.

References Cited in the file of this patent

UNITED STATES PATENTS

| Number | Name | Date |
|---|---|---|
| 1,486,916 | Novy | Mar. 18, 1924 |
| 1,545,007 | Milliken | July 7, 1925 |
| 1,796,466 | Lage | Mar. 17, 1931 |
| 2,349,868 | Hyde | May 30, 1944 |